United States Patent [19]

Baer

[11] Patent Number: 4,571,640
[45] Date of Patent: Feb. 18, 1986

[54] VIDEO DISC PROGRAM BRANCHING SYSTEM

[75] Inventor: Ralph H. Baer, Manchester, N.H.

[73] Assignee: Sanders Associates, Inc., Nashua, N.H.

[21] Appl. No.: 438,139

[22] Filed: Nov. 1, 1982

[51] Int. Cl.$^4$ ............................................. H04N 5/781
[52] U.S. Cl. ...................................... 358/342; 369/32; 369/33; 369/41; 358/142; 434/323; 434/336
[58] Field of Search ........................ 358/342, 343, 142; 369/32, 33, 41, 126, 109, 111; 434/323, 335, 336, 309

[56] References Cited

U.S. PATENT DOCUMENTS 2,009,438  7/1935  Dudley ............................ 358/142 X
3,164,685  1/1965  Banning, Jr. et al. .................. 369/7
4,052,798  10/1977  Tomita et al. ................... 434/336 X

OTHER PUBLICATIONS

Bogels, System Coding Parameter, IEEE Transactions on Consumer Electronics, 11/76, pp. 309–317.
Bennion et al., Interactive Videodisc Systems for Education, Journal of the SMPTE, vol. 84, No. 12, 12/75, pp. 949–953.
Inoue et al., The VHD Video Disk System, SMPTE Journal, 11/82, pp. 1071–1076.
Clemens, RCA Review, vol. 39, 3/78, pp. 33–59.

Primary Examiner—Robert L. Richardson
Attorney, Agent, or Firm—Louis Etlinger; Richard I. Seligman

[57] ABSTRACT

A video disc program branching system comprising multiple programs frequency multiplexed on a video disc and co-located substantially in the same portion of the disc wherein branching is achieved by designating specific ones of said multiple programs through frequency band selection.

9 Claims, 4 Drawing Figures

VIDEO DISC PROGRAM BRANCHING SYSTEM

BACKGROUND OF THE INVENTION

This invention relates to video disc systems and more particularly to video disc systems wherein the playback unit is used in an interactive mode.

Advancing technology has improved the quality of life of persons in today's society; however, it also has required that the citizens thereof become more knowledgeable in more areas. This requirement necessitates that the education process be similarly advanced and that better learning tools become available to the educators. One of such tools of recent vintage is the video disc system. This system allows video signals to be recorded on a disc and played back such that the output can be applied to a television receiver to display pictorial information and also provide sound. The video disc system has advantages over the video tape recorder in the education field since the system allows one to skip or move from one portion of the disc to a remote portion without moving through the intermediate portion of the disc grooves. This is done by directly moving the pickup drive mechanism from one portion of the disc to the other portion.

This feature readily permits branching such that when one portion of the disc is played back and displayed on the television receiver, a student, for example, can respond to the information on that portion of the disc by making a selection which will cause the disc system to select other portions of the disc to be played back depending upon the student's response. For example, in a testing situation, on the first portion of the disc, the student may be asked a question, and be provided with a multiple choice of answers. Depending on which answer the student selected, the playback unit will then branch to a particular portion of the disc. For example, if the student selected a correct answer the pickup may branch to a portion of the disc displaying information telling the student that he has selected the correct answer; however, if the student has selected an incorrect answer, the pickup may branch to a portion of the disc which would display information informing the student that he has selected the wrong answer and may also provide some additional material as, for example, some tutorial review of the material about which he showed lack of knowledge.

One major problem with moving the pickup to provide branching is that the branching is relatively slow. The time taken to branch to a new section of a disc after receipt of a branching command may be often a couple of seconds up to perhaps ten seconds. This is very disruptive to the continuity of the presentation and, in fact, it may be unacceptable in many training and educational applications.

Accordingly, it is an object of this invention to provide improved video disc branching.

It is another object of this invention to provide more rapid branching from one recorded selection of a video disc to another selection of the same disc which may be co-located in the same portion of the disc.

SUMMARY OF THE INVENTION

Briefly, improved video disc branching, according to the invention, is achieved by frequency multiplexing two or more video and sound presentations during the recording process. Several current disc systems make use of only a small part of the available bandwidth. Typically, a video disc may have recorded thereon two audio channels (for stereo presentations or alternate languages) and a video channel including luminance information, chroma information, and synchronization information. The total bandwidth of the two audio channels and the video channel is very much less than that of the capability of the disc system. For example, in current capacitive systems, the inherent total bandwidth capacity is several times the bandwidth currently used to carry the audio and video channels.

Accordingly, additional channels containing audio and video signals may be recorded on the same space as the first recorded video and audio signals such that during playback, one of the plurality of video and audio signals may be selected from the disc through selection of proper passband frequencies. Since different groups of signals (each of which includes a video and at least one audio channel) are recorded on the same portion of the disc, that is co-located in the same physical space within the disc grooves, rapid switching between one or another of the groups of signals can be made, greatly increasing the ability to branch over that of conventional systems which require perhaps large movement of the drive mechanism carrying the pickup in the video disc player.

BRIEF DESCRIPTION OF THE DRAWINGS

The above-mentioned and other features and objects of the present invention will become more apparent by reference to the following description taken in conjunction with the accompanying drawings, in which.

DESCRIPTION OF PREFERRED EMBODIMENTS

Figure 1:
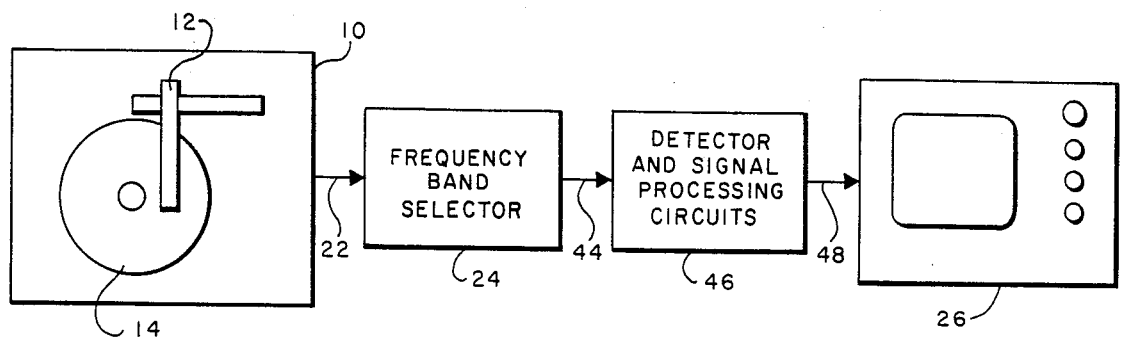
FIG. 1 is a block diagram of an embodiment of a video disc program branching system according to the principles of the invention.
Figure 3:
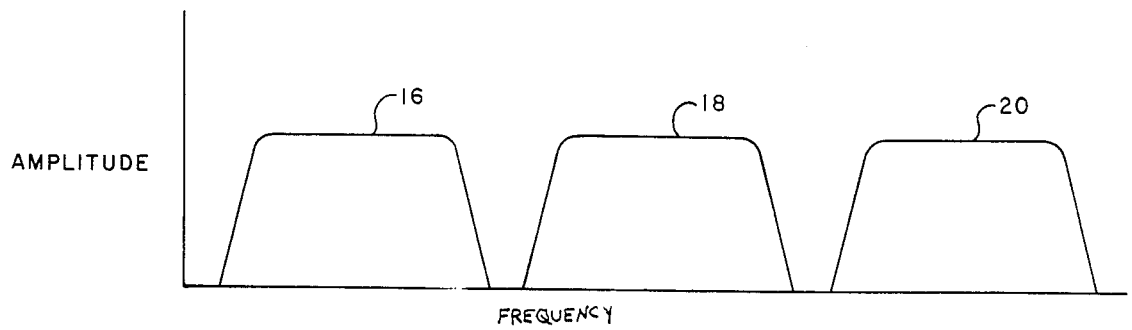
FIG. 3 is an amplitude versus frequency spectral plot illustrating multiple programs co-located in the same "grooves" of a video disc recording.

Referring now to FIG. 1, there is illustrated a first embodiment of the present invention. The system of FIG. 1 includes a video disc player 10 including a pickup arm 12 and having a video disc 14 thereon, on which programs are recorded. The frequency band spectrum of a typical program recorded on disc 14 in accordance with the prior art is illustrated in FIG. 3. The information is illustrated by group or frequency band 16 which includes at least a first audio channel, a second audio channel, if desired, and a video channel including luminance, chroma and synchronization signals. Current video disc systems have a bandwidth capability much greater than that encompassed by the signals of group 16. Accordingly, in accordance with the present invention, in addition to the group of signals 16 recorded on video disc 14, additional groups of signals 18 and 20 are also recorded on the disc. Group 18 comprises one or two audio channels, plus a video channel including chroma, luminance and synchronization signals. Group 20 likewise comprises audio channels plus a video channel. Each of the groups of signals 16, 18 and 20 represent distinct programs. These three groups of signals are all co-located in substantially the same place on the video disc such that one of these groups of signals 16, 18 or 20 can be selected by proper selection of the frequency band which includes the particular signals desired.

Figure 2:
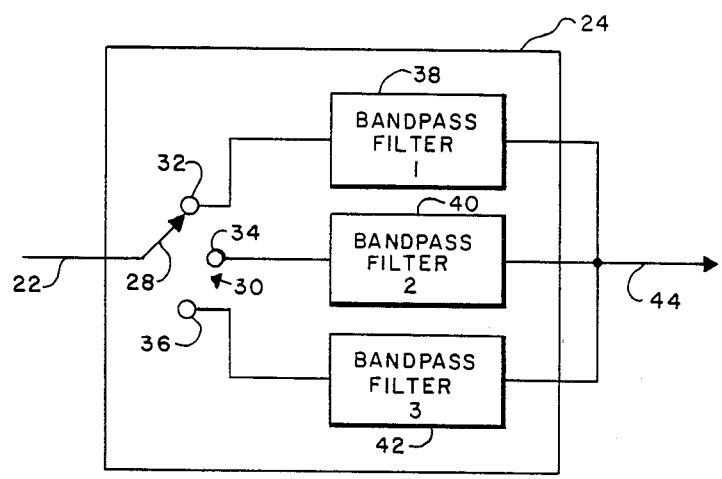
FIG. 2 is a diagram of a frequency band selector employed in the embodiment of FIG. 1.

Referring again to FIG. 1, the output from video disc player 12, which is derived from the video disc 14 via pickup arm 12, is applied via line 22 to a frequency band selector 24. The output on line 22 contains multiple programs, including the groups of signals 16, 18 and 20. The frequency band selector 24 selects which of the groups 16, 18 and 20 is to be processed and displayed on a television receiver 26. A typical frequency band selector is illustrated in FIG. 2 of the drawings. The signal on line 22 is applied to the arm 28 of a switch 30. Switch 30 has contacts 32, 34 and 36 for connecting the signal on line 22 to one of three bandpass filters 38, 40 and 42. If the user wishes to apply the group of signals 16 to receiver 26 to display a first program, then the arm 28 of switch 30 is applied to contact 32 to apply the signal on line 22 via a bandpass filter 38 which then only outputs the group of signals 16. Likewise, if the group of signals 18 or 20 are to be coupled to the television receiver 26, then switch 30 is employed to couple the signals on line 22 to either bandpass filter 40 or bandpass filter 42.

The output from the frequency band selector 24 is applied along line 44 to detector and signal processing circuits 46. This is the conventional processing unit found in current video disc systems and this circuitry functions in conventional manner to reconstruct the video signal into one corresponding to the NTSC standards. The output from these circuits on line 48 is applied to the television receiver 26 in conventional fashion.

While a manual switch 30 is shown to select which of the groups 16, 18 and 20 corresponding to three different programs is to be applied to the television receiver, as an alternative the switch may be an electronic switch responsive to a push button pressed by a viewer. The push button could be located directly on the video disc player itself or located on a remote control device operated by the viewer.

Figure 4:
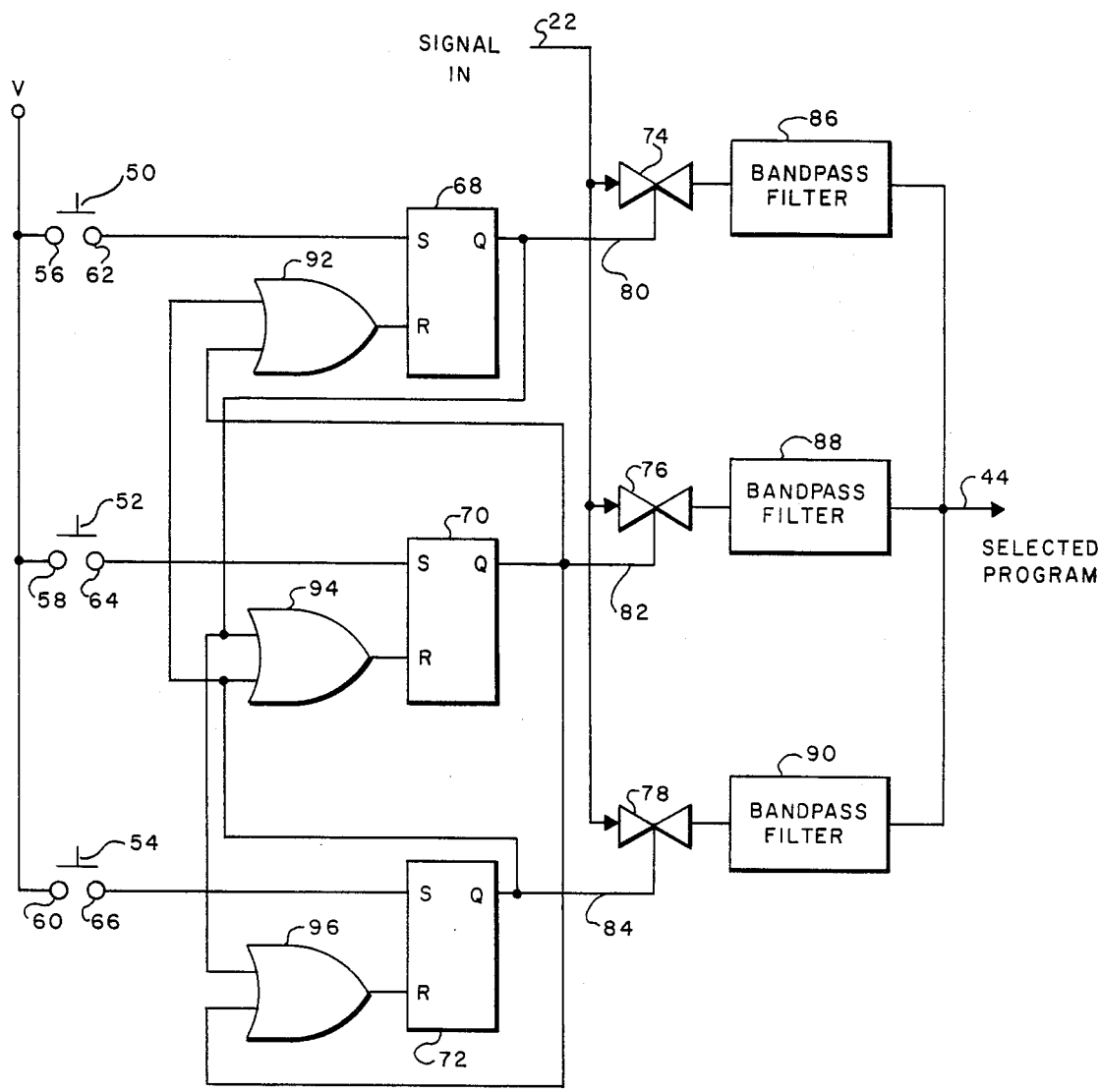
FIG. 4 is a schematic representation of a second embodiment of a frequency band selector.

FIG. 4 illustrates an alternative embodiment for the frequency band selector 24 of FIG. 2. This circuit includes three momentary push button switches 50, 52 and 54. One contact of each 56, 58 and 56 is connected to a source of voltage and the other contacts 62, 64 and 66 are connected to the set input of respective set/reset flip-flops 68, 70 and 72. The input signal to the frequency band selector from line 22 is applied to a plurality of analog switches 74, 76 and 78 which have digital controls therefor applied along lines 80, 82 and 84. The outputs from the analog switches are applied to bandpass filters 86, 88 and 90 which would be equivalent to the bandpass filters 38, 40 and 42 of the FIG. 2 embodiment. The selected program is outputed on line 44 as discussed hereinbefore. This circuit also includes three OR gates 92, 94 and 96, the outputs of which are connected to the reset inputs of the flip-flops 68, 70 and 72, respectively.

Operation of this circuit will now be described in conjunction with a typical example. A student, by pressing momentary push button switch 50, sets the Q output of set/reset flip-flop 68 to its high position, thereby closing the analog switch 74 and permitting the signal on line 22 to be applied to bandpass filter 86. This signal comprises, for example, the information embodied in the group of signals 16 of FIG. 3 and might comprise a question to a student. This information, when displayed on television receiver 26, would, for example, pose the question as well as present two possible answers to the question. The student then would select a response to the question by depressing either momentary push button switch 52 or momentary push button switch 54. If momentary push button switch 52 was depressed, then the signal 22 would be applied via the analog switch 76 to bandpass filter 88, providing to the television receiver the group of signals 18, representing the second program co-located on the disc 14. On the other hand, if the student selected the other answer by pressing momentary switch 54, this would cause signal 22 to be applied via analog switch 78 to bandpass filter 90, coupling to the detector and signal processing circuits 46, the group of signals represented in FIG. 3 by group 20. Each of these programs would convey different information. For example, if the push button switch corresponding to the correct answer was selected, then perhaps the program displayed would inform the student that he had selected the correct answer and perhaps give him a little more information. On the other hand, if the incorrect answer was selected, then this information would be conveyed to the student and perhaps a tutorial on the information requested by the answer might be presented so that the student would be able to determine where he had made his mistake.

The OR gates 92, 94 and 96 are so wired such that when depressing one of the switches 50, 52 and 54, they will allow only the corresponding analog switch 74, 76 and 78 to close and will disable the other analog switches so that only one of the three programs recorded on the disc would be outputted along line 44.

While discrete circuitry has been shown for accomplishing the frequency selection, namely the circuitry of FIG. 2 or FIG. 4, it would be obvious that these selections could be made under the control of a microprocessor located within the disc player 10 or a computer external to the disc player but interfaced with it. A simple program could be provided to cause the microprocessor to output the correct commands to occasion the necessary switching from one program to another. This would be well within the skill of a programmer.

While the embodiments of this invention have been described in a training scenario, the application of the techniques employing branching are much wider and may be employed in other fields; for example, they may be employed with video games where in a particular game scenario branching may be appropriate. Also, while the preferred embodiments relate to video disc branching, the techniques will be applicable to video tape also as the video tape players improve to where large bandwidth signals can be recorded thereon. Thus, it is to be understood that the embodiments shown are illustrative only and that many variations and modifications may be made without departing from the principles of the invention herein disclosed and defined by the appended claims.

I claim:

1. A video disc program branching system comprising:
   a video disc player;
   a video disc having recorded thereon a plurality of groups of signals co-located on substantially the same portion of the disc, each group containing different program material recorded at different frequencies; and
   means for branching by selecting predetermined ones of said multiple programs.

2. The system of claim 1 wherein said groups of programs are co-located in the same groove of the video disc.

3. The system of claim 1 wherein said selection means includes tuning apparatus responsive only to predetermined ones of said selected groups of signals.

4. A video disc program branching system, comprising:
   a video disc having frequency multiplexed thereon multiple related programs co-located in substantially the same portion of said disc; and
   means for branching by selecting specific ones of said multiple programs.

5. A method of effecting rapid branching of multiple programs frequency multiplex recorded on substantially the same portion of a video disc, comprising the steps of:
   selecting specific ones of said multiple programs; and
   passband filtering the recorded signal to output the selected program.

6. A video recording medium branching system, comprising:
   a video playback unit;
   a video recording medium having recorded thereon a plurality of programs which are co-located on substantially the same portion of the video recording medium;
   means for responding to one of such programs which is displayed; and
   means responsive to said responding means to display another of such programs.

7. A method of effecting rapid branching between multiple programs recorded on a video disc, comprising the steps of:
   displaying one of such programs;
   selecting a response to the information displayed by said one program; and
   displaying another of such programs in accordance with such selected response by bandpass filtering the recorded programs to couple only a single program to a display.

8. A video disc program branching system, comprising:
   a video disc having recorded thereon a plurality of groups of signals co-located on substantially the same portion of the disc, each group containing different program material and comprising a different band of frequencies;
   means for displaying at least one of said programs;
   means for electing a particular response to said displayed one program; and
   means for displaying another of said programs depending on the elected response.

9. The system of claim 8 wherein said means for displaying another of said programs includes a plurality of bandpass filters, one of which is coupled to said video disc in response to said election means.

* * * * *